Nov. 27, 1945.  O. L. CARTER ET AL  2,389,595
PLASTIC PICKER STICK
Filed July 10, 1944
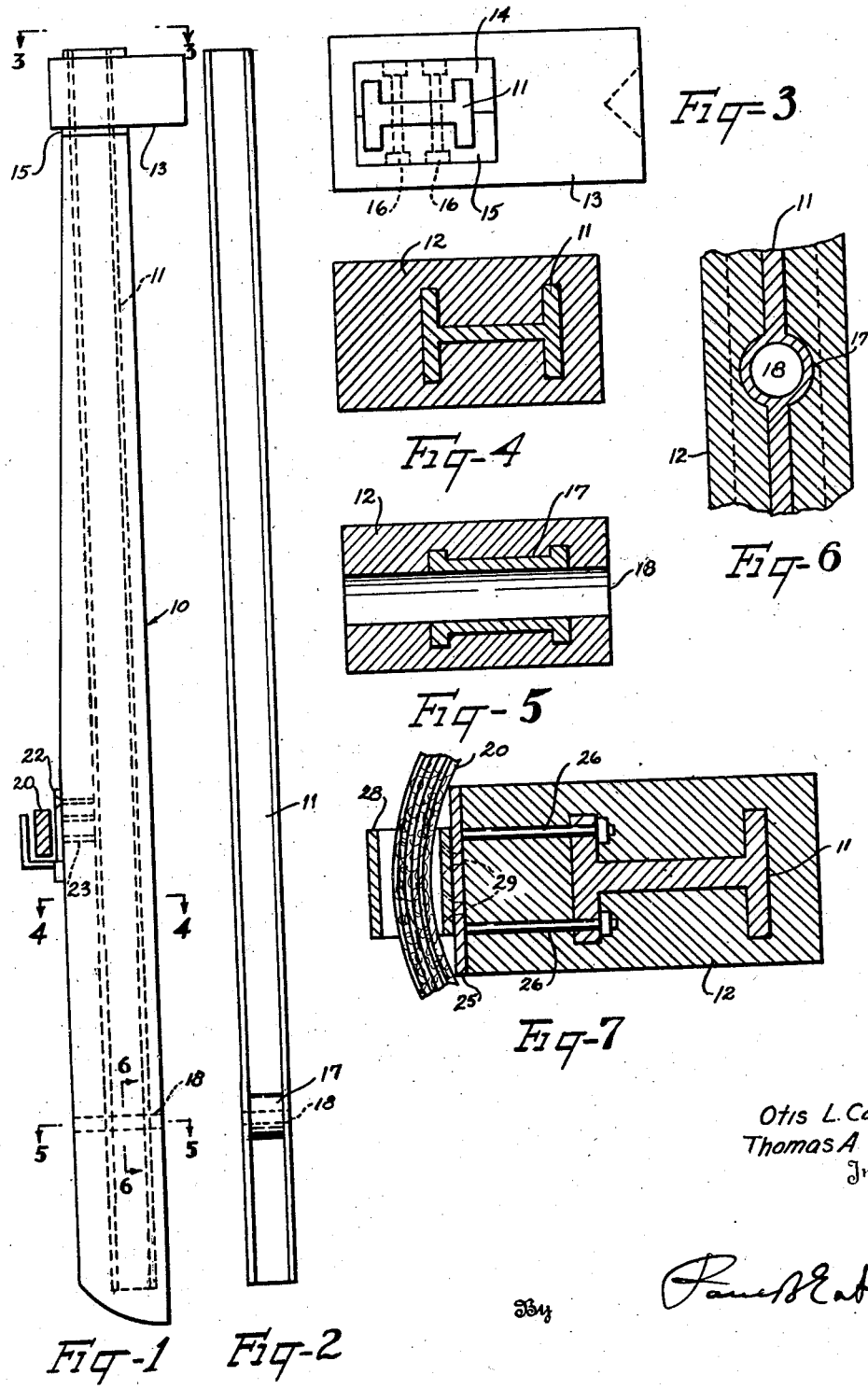
Otis L. Carter
Thomas A. Putnam
Inventor Patented Nov. 27, 1945

2,389,595

UNITED STATES PATENT OFFICE 2,389,595

PLASTIC PICKER STICK

Otis L. Carter and Thomas A. Putnam,
Greenville, S. C

Application July 10, 1944, Serial No. 544,177

2 Claims. (Cl. 139—157).

This invention relates to a picker stick for looms and more especially to a picker stick made of molded plastic material and having a reinforcing member extending longitudinally thereof and around which the plastic material is molded, the upper end of the picker stick may, if desired, have secured therearound a pair of blocks such as rubber, wood, and the like over which the picker is adapted to be fitted as it is difficult to retain a picker on a plastic shell of a picker stick.

It is an object of this invention to provide a picker stick for looms made of molded plastic material which is molded or cast around a longitudinally extending reinforcing member, the picker stick at its upper end having means secured therearound and over which the picker is adapted to be placed, said picker stick also having adjustably secured thereon a support for the lug strap and the reinforcing member having an enlarged portion on its connecting rib for formation of a hole for securing the lower end of the picker stick to the shoe which runs on the parallel of the loom. In one form of the invention, the means for adjustably supporting the picker stick is anchored directly to the reinforcing member in the picker stick and has a vertically adjustable supporting member thereon for supporting the lug strap, while in another form of the invention, the supporting means for the lug strap is secured in one of several holes in the plastic portion of the picker stick.

It is another object of this invention to provide a picker stick made of plastic material, and having a reinforcing I-beam extending longitudinally thereof and encased by the plastic material, and having means on its upper end for holding a picker thereon.

Some of the objects of the invention having been stated, other objects will appear as the description proceeds, when taken in connection with the accompanying drawing, in which:

Figure 1 is a side elevation of a picker stick and showing the lug strap in section;

Figure 2 is a side elevation of the reinforcing member which is adapted to be encased by the plastic material;

Figure 3 is a top plan view taken along the line 3—3 in Figure 1;

Figure 4 is a cross-sectional view taken along the line 4—4 in Figure 1;

Figure 5 is a cross-sectional view taken along the line 5—5 in Figure 1;

Figure 6 is a vertical sectional view taken along the line 6—6 in Figure 1;

Figure 7 is a cross-sectional view taken through the picker stick and showing a modified form of means for adjustably holding the lug strap at the proper elevation.

Referring more specifically to the drawing, the numeral 10 indicates a picker stick for looms which has extending longitudinally thereof an I-beam 11 which is made of aluminum, stainless steel, or a suitable metallic alloy. This I-beam is encased by a suitable molded plastic 12 extending below and encasing the lower end of the picker stick and extending almost to the top of the picker stick. At the top of the picker stick, there is adapted to be fitted thereover a conventional picker 13. Due to the fact that plastic is rather slick, it might be difficult to cause a picker to stay in proper position on a plastic picker stick, and therefore, we secure a pair of blocks 14 and 15 on each side of the I-beam by means of bolts 16 and over these blocks 14 and 15, the picker may be secured. These blocks are made of rubber, composition material, wood, or any other suitable material which will cause the picker not to slip off of the same easily, but to remain in adjusted position thereon.

The lower portion of the rib of the I-beam 11 is flared outwardly as at 17 to provide material through which a hole 18 may pass from front to rear of the picker stick through the I-beam 11 as well as the plastic to the front and rear of the I-beam. This hole is adapted to receive a suitable bolt for securing a conventional shoe on the lower end of the picker stick.

Some means must be provided for adjusting the vertical position of a lug strap 20 on the picker stick, and in Figure 1, we show a forked clip 22 which can be secured in any one of the threaded holes 23 provided in the plastic portion of the picker stick. If desired, instead of having the lug strap supporting member screwed into the plastic portion, we can provide a plate member 25 having a pair of bolts 26 integral therewith, and these penetrate one portion of the I-beam and have nuts on their free ends for supporting the plate 25 directly from the reinforcing member 11. When the plate and bolts are in adjusted position, the plastic material 12 is molded around the entire assembly, and then when the picker stick is completed, a suitable U-shaped member 28 may be adjustably secured on the plate 25 by any suitable means such as screws 29.

The type of plastic material 12 which is used is any suitable moldable plastic material which may be molded around the reinforcing bar 11.

It is thus seen that we have provided a very suitable picker stick, one having great strength and the required resiliency and which will not be subject to splitting as wooden picker stick are, and one which will last indefinitely.

In the drawing and specification, there has been set forth a preferred embodiment of the invention, and although specific terms are employed, they are used in a generic and descriptive sense only, and not for purposes of limitation, the scope of the invention being defined in the claims.

We claim:

1. A plastic picker stick for looms comprising a longitudinally extending reinforcing member having the plastic material molded therearound, means secured to the reinforcing member and extending to the exterior surface of the plastic material and around which the plastic material is molded to provide a supporting means for the lug strap associated with a loom and a picker stick.

2. A picker stick comprising an I-beam having a plastic covering molded therearound, the upper end of the I-beam extending beyond the plastic covering, means secured to opposed sides of the extending end of the I-beam to form a rectangular portion in cross-section around which a picker can be secured, the lower portion of the I-beam having an enlarged web portion and having a hole extending through the enlarged portion and the plastic covering for securing a shoe thereto.

OTIS L. CARTER.
THOMAS A. PUTNAM.